United States Patent Office 3,447,837
Patented June 3, 1969

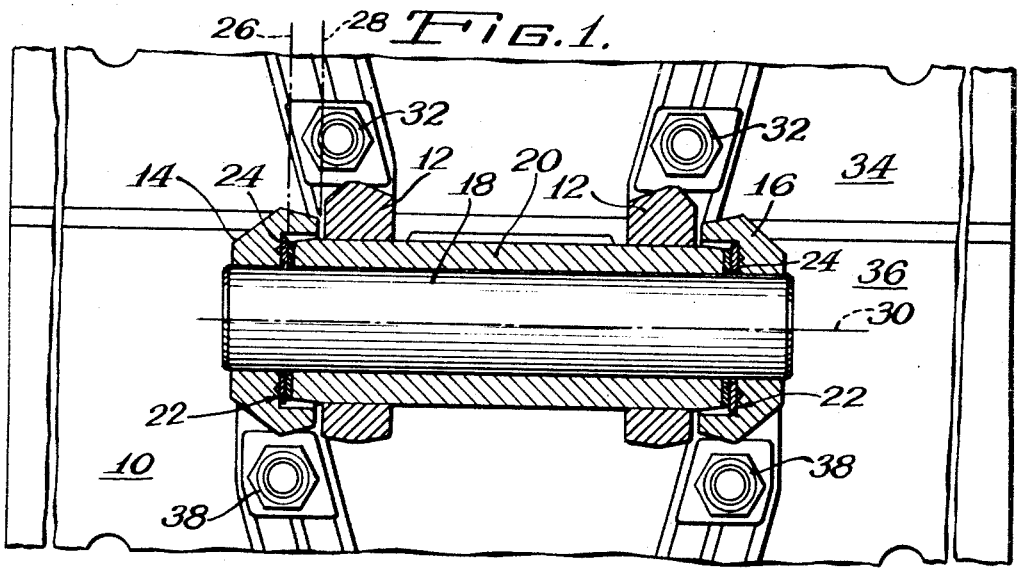
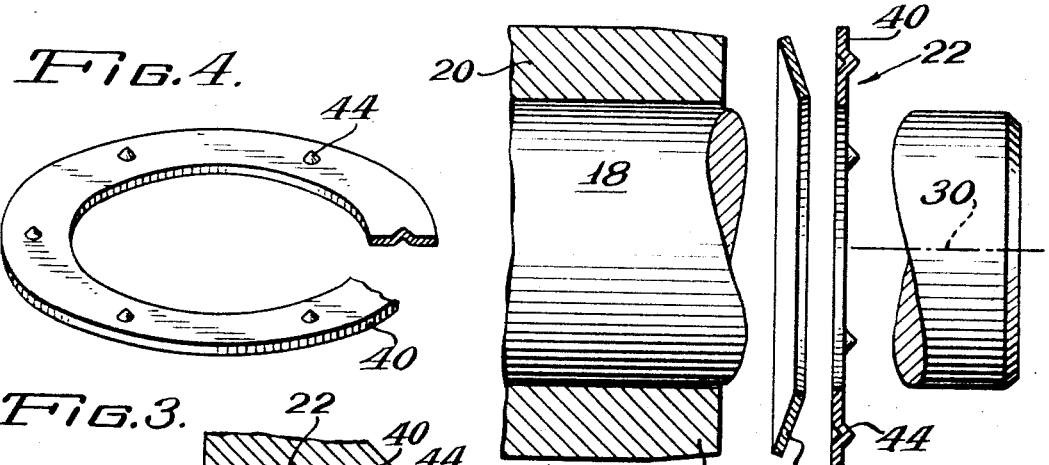
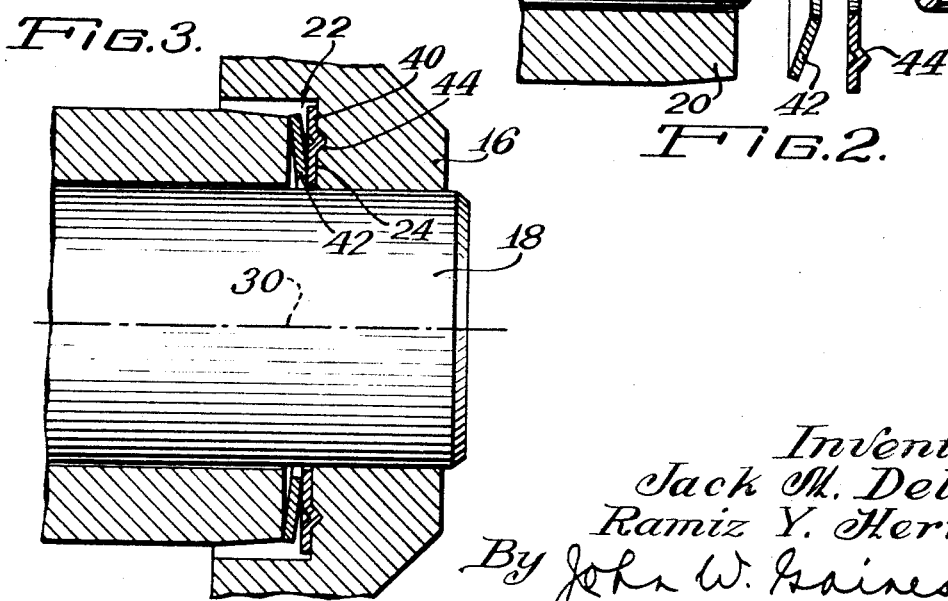
Inventors:
Jack M. Deli
Ramiz Y. Hermiz
By John W. Haines
Atty.

3,447,837
TRACK PIN AND BUSHING SEAL ASSEMBLY
Jack M. Deli, Wheaton, and Ramiz Y. Hermiz, Addison,
Ill., assignors to International Harvester Company, Chicago, Ill., a corporation of Delaware
Filed Sept. 8, 1967, Ser. No. 666,446
Int. Cl. B62d 55/26; B21k 19/00; B23p 11/00
U.S. Cl. 305—11                                      11 Claims

ABSTRACT OF THE DISCLOSURE

Track pin and bushing seal assembly made of relatively rotatable and relatively fixed thrust washers, the fixed one being flat and taking a permanently self-anchored position during assembly, and the other washer flattening elastically from an initial frustoconical shape so as to store energy for automatic axial wear take-up.

---

This invention relates to a two-element rotary metal seal for the pin and bushing present in the track chain of a crawler vehicle, and the seal is adapted particularly to fit in seal recess formed within a link at the joint in the track chain. One element, provided with metal penetrating, perpendicular cone points thereon, is a flat washer which, during assembly, permanently torsionally locks itself to the base of the seal recess because the points are hard and permanently deform the end wall material with a spiking action without appreciable deflection or permanent set. The other element is a Belleville spring steel washer which, during assembly, flattens only elastically from its initial frustoconical shape, which it continually tries to restore itself back into. The spring washer thus elastically resists axial deflection and gradually re-expands in service to take up for axial wear occurring in the joint.

According to practice in the past, a plurality of Belleville spring washers has been put to use, arranged in immediate engagement at their similar ends so as to provide a thrust seal. Their ends coincide in only one common circle and it has therefore been an inherency of the practice that, if adjacent washers shift slightly eccentrically to one another in any radial direction, their interface of contact is reduced to two, high stress points only, rather than being distributed in a full circle of contact. Among others, one disadvantage is apparent in that the engaged springs will have a sealing difficulty. Another disadvantage is the difficulty that the interface, where relative rotation occurs, may transfer from an inter-spring wear area as desired to an inter-recess-and-spring wear area which is undesired.

The foregoing difficulties are materally reduced or substantially eliminated by our two-element seal invention, wherein the inner margin of the Belleville spring is of a relatively large ID (inside diameter) compared to the ID of the flat fixed washer, thus insuring a sealing locus of such inner margin that is always a full circle or ring of pressure contact against a fixed planar metal wear facing, as will now be explained in detail. Various features, objects, and advantages will either be specifically pointed out or become apparent when, for a better understanding of our invention, reference is made to the following description taken in conjunction with the accompanying drawing, which shows a preferred embodiment thereof and in which:

FIGURE 1 is a post-assembly showing, in sectioned plan view, of a part of the track chain of a crawler vehicle;

FIGURE 2 is a pre-assembly showing, to enlarged cross sectional scale, of a detail of the joint of FIGURE 1;

FIGURE 3 is a showing of the joint similar to FIGURE 2, but as it appears after the joint has been assembled and starts to show wear in service; and FIGURE 4 is an isomeric view of a washer detail.

More particularly as shown in the drawing, each joint in the illustrated track chain assembly 10 includes two links having inner portions referred to as inner links 12, two more links having outer portions referred to as respective outer links 14 and 16, a pin 18 and a pin bushing 20 rotatable thereon, and a flattened, metal, two-element, face seal assembly 22 held under compression in a seal recess 24 formed in the face of each of the outer links 14 and 16.

The two seal assemblies 22 are disposed one at each end of the bushing 20, and serve both as a thrust transmitting means for the end thrust transmitted by the bushing into the adjacent outer link, and as a rotary seal keeping out the dirt and keeping in a coating of lubricant, not shown, which is sealed-in between the pin 18 and the bushing. The seal recess 24 in each outer link results from counterboring same to an axial depth sufficient to completely house therein the projecting thrust end of the bushing 20, thereby displacing the radially disposed end face of the bushing and the confronting seal assembly 22 from direct ingress of dirt.

Thus the plane 26 of the seal which is conveniently indicated as passing between the two elements thereof, is materially axially offset from the plane 28 between the links of the joint, and the referred to thrust end of the bushing 20 is similarly offset.

The bolts 32 of a four-bolt group secure the inner links 12 to a leading track shoe 34 carried thereby, and the next or relatively trailing shoe 36 is secured to the respective outer links 14 and 16 by a similar four-bolt group including the two bolts 38. During forward motion of the vehicle, the so-called leading shoe 34 is the first one of the two to strike the ground and is the first one of the two to reach the drive sprocket of a vehicle, not shown, equipped with the present crawler track chain.

In FIGURE 2, the pin 18 and the bushing 20 take the form of a pre-assembly after the inner links 12, not shown, are press fitted on the exterior of the bushing 20. Actually, the seal assembly 22 is in only one of its pre-assembly arrangements, appearing in a partially exploded theoretical view with the elements loose and precisely squared to and centered on the joint axis 30. One of the elements is a flat washer 40, one face of which is confronted by the base of the recess 24 and the other face of which is confronted by the outside face of the other element, namely, a normally frustoconical spring washer 42.

The links 14 and 16 are heat treated steel having a hardness in the base of the recesses reading approximately in the range between Rockwell C20 and Rockwell C25. Washers 40 and 42 are a spring steel at least slightly harder than the links, and preferably being approximately in the range between Rockwell C48 and C50, as one numerical example.

The desiderata here are that the flat washer 40 be formed with a ring of metal penetrating, perpendicular pointed protrusions 44, e.g., six integral, equally spaced, and strip-centered dimpled cones, so as to be self-anchoring, and that the flat washer 40 extend at the inner periphery radially beyond the corresponding inner periphery of the spring washer 42. The extension radially inwardly is necessary irrespective of the stressed condition of the washer 42 and irrespective of the radial displacement of either washer relative to the other in the plane of the recess 24, for reasons now to be explained.

In operation in a new joint, shown with exaggerated wear in FIGURE 3 for illustrative purposes, the metal face seal assembly 22 theoretically shows signs of a transition with the first perceptible increment of rotative wear. The thickness of the recess 24 does not change, whereas the two-element seal immediately becomes thinner.

From its flat deflected position, the spring washer 42 begins to cone in the direction of the flat washer 40. In place of the essentially flat face-to-face contact theretofore, the inner periphery of the spring washer 42 along its external face exerts a ring of pressure contact tending more and more to vacate the outer circumference and to concentrate along the inner periphery of the flat washer 40. The spring washer 42, however, continues to react with effectiveness and to transmit end thrust received from time to time from the bushing 20, collapsing each time into its deflected-flat position in doing so. The forces on the flat washer 40 are equal, registered, and opposite because the washer is backed up by metal in the base of the recess in link 16.

The exact measurements are not overly critical. It works out entirely satisfactorily when the minimum spring washer ID exceeds by roughly 1.8% the maximum ID of the flat washer 40, one example being that the minimum spring ID is 2.195" and the flat washer maximum ID is 2.155". In one of the detail drawings made of the flat washer, the individual protrusion was shown to have a height equal to the thickness of the integral flat washer 40, and each protrusion 44 is preferably at least that high.

*Assembly generally*

At the time of beginning the final stage of assembly of the joint, the parts fitted up at that time consist of at least each inner link 12 and the pin 18, which have respectively an interference fit with the bushing 20 achieved with a power press, and a hinge fit with the bushing 20 which, after lubrication of the bore in the bushing, is achieved by sliding the pin 18 thereinto until it protrudes at each end beyond the corresponding end of the bushing.

Then, with the thrust washers in one form of pre-assembly or the other relative to the counterbored outer links 14 and 16, the outer links 14 and 16 are forced onto and along the outer ends of the pin 18 toward one another. When relative axial movement stops, the bushing 20 acts as spacer and the press power builds to a predetermined force value, at which time the assemblies 22 are flat. Thereafter, pressure is released in the press and the assembly is removed complete, for bolting thereonto the track shoes.

If the spring 42 is reversed end for end in FIGURE 2, the spring will then seal in a circle or ring of pressure contact with its outer periphery against the flat washer 40 instead of against the bushing 20. Hence, direct protection of the bushing end from dirt may be impaired and the likelihood that relative rotation will always occur at the interface of the washers may be reduced.

*Assembly specifically*

The following assembly modes are given by way of descriptive examples and not of limitation.

In one preferred method using serial steps of assembly, each link 14 is inverted so that the base of the recess 24 faces upwardly, and a pre-assembly is effected by means of the washer 40 which is forced into the recess 24 with the perpendicular protrusions 44 against the base of the recess. A mandrel is used which is press operated and the washer 40 is pressed thereby into a permanent position, as shown in FIGURE 3, in which it is self-anchored by the points on the metal penetrating protrusions which torsionally and axially lock the washer in place. The relatively softer steel material in the base of the recess is permanently deformed whereas the points on the protrusions take little or no deflection or permanent set.

Before the thus pre-assembled link 14 and the rest of the assembly are finally pressed together, the Belleville spring washer 42 at each end is added loosely over the projecting end of the pin 18, which latter has a horizontal position as illustrated in FIGURE 2. Then the respective links 14 and 16 at each end of the pin 18 are pressed thereonto into final position.

Another preferred method of assembly using one step eliminates the pre-assembly. Instead, and with the parts appearing in FIGURE 2 arranged in the relationship and attitude as there illustrated, the outer links, not shown, are introduced in a disposition one at each end of the pin 18, and are pressed into a final position collapsing the interposed seal assemblies 22.

From the foregoing, it is seen that our latter method comprises first, the interposition, in the path of assembly of the outer link part and bushing part, of frustoconical spring and flat washers arranged with the flat washer between the small end of the spring washer and the base of the counterbore recess; and, secondly, the relative deflection of the washer toward flat face-to-face contact, accomplished by forcing the parts toward one another, and characterized by the metal puncturing projections on the flat washer embedding into permanent interengagement in the deformed end wall material of the recess, and the spring washer storing elastic energy for take-up of axial wear in the joint incident to extended operation in service.

The wear just referred to is characterized by two things. It tends to be confined to the interfaces within the seal assembly itself while the latter is under any appreciable amount of axial preload. The spring, at least in theory, will continue to expand or cone in taking up end play in the seal recess until the spring metal has reached a fully relaxed condition.

Variations within the spirit and scope of the invention described are equally comprehended by the foregoing description.

What is claimed is:

1. In a joint in which a pin bushing and a link are relatively rotatably interconnected by a track pin, said bushing having a thrust end part projecting both toward the base part of a bushing recess in the link and at least partway into the latter, the improvement of:
  a plurality of substantially radially coextensive thrust washers operatively related together within the recess between the just said parts, comprising an assembly of frustoconical spring and flat washers which, by accommodating by relative deflection therebetween, are forced toward flat face-to-face contact in said recess by forcing one of said parts toward the other;
  said assembly characterized by the flat washer confronting the base of the recess for complementarily metal-facing the same; and
  a set of circumferentially spaced apart metal penetrating protrusions carried by the flat washer on the face adjacent the end of the recess so as to be in substantially perpendicularly confronting relation to the base part prior to, and be self-penetratingly embedded in and torsionally locked in the wall of the base part of the recess after, application of a flattening deflecting force so that said spring washer in final assembly can accommodate to relative rotation of the parts by rubbing at all points against a non-rotatable, essentially planar metal wear facing.

2. The invention of claim 1, the flat washer characterized by projecting radially beyond a corresponding peripheral portion of the spring washer whereby the latter provides, at the least, an uninterrupted ring of pressure contact with the flat washer.

3. The invention of claim 2, characterized by the aforesaid peripheral portion of the frustoconical spring washer comprising the small end, and said flat washer projecting radially inwardly thereof.

4. The invention of claim 1, characterized by the minimum ID (inside diameter) of the spring washer exceeding the maximum ID of the flat washer by at least about 1.8%.

5. The invention of claim 1, characterized by said plurality of spring and flat washers in assembly between the recess part and the projecting thrust part of the bushing consisting essentially of one washer each, of the two types.

6. The invention of claim 1, the set of protrusions characterized by a ring of cone points on the washer face which are equally spaced apart and spaced apart from both peripheries of said face.

7. The invention of claim 6, characterized by each cone having a height of protrusion from said face of at least about the thickness of the flat washer.

8. Method of metal facing the base part of the bushing recess during final assembly of a track link joint, said joint comprising a link and a pin bushing which are relatively rotatably interconnected by a track pin, and which link has the aforesaid bushing recess formed therein so as to receive, in a path of relative movement in the direction of said base part of the recess, a projecting thrust part of the pin bushing, said method comprising:

the interposition in said path of an assembly of frusto-conical spring and flat washers arranged so that the base part will be confronted by and contacted by one flat face of the flat washer, said one face carrying a plurality of spaced apart, metal penetrating protrusions;

and the relative deflection of the washers toward flat face-to-face contact, accomplished by forcing one of said parts toward the other and characterized by self-penetration of the protrusions on said one face of the flat washer permanently into interengaged embedment in deformed material of the recess wall so as to torsionally lock to the base, and the spring washer storing elastic energy for automatic wear take-up in the joint attendant with subsequent wear.

9. The invention of claim 8, said deflection characterized by permanent deformation of the recess wall due to spiking action of the protrusions without appreciable deflection or permanent set in the protrusions, and the spring washer flattening without appreciable permanent set.

10. The method of claim 8, characterized by:

dimplementation of the other face of the flat washer to form the protrusions as integral, cone points on the aforesaid one washer face.

11. A final assembly achieved by the method of claim 8, characterized by the flat washer projecting radially inwardly beyond a corresponding peripheral portion of the spring washer whereby the latter provides, at the least, an uninterrupted ring of pressure contact with the flat washer.

References Cited

UNITED STATES PATENTS

| | | | |
|---|---|---|---|
| 2,010,099 | 8/1935 | Lyon. | |
| 3,050,346 | 8/1962 | Simpson | 305—11 |
| 3,195,962 | 7/1965 | Hayatian | 305—11 |
| 3,336,089 | 8/1967 | Krickler | 305—11 |

RICHARD J. JOHNSON, *Primary Examiner.*

U.S. Cl. X.R.

29—148.3, 521; 74—255